No. 614,495. Patented Nov. 22, 1898.
H. W. OLDAKER.
THILL FOR VEHICLES.
(Application filed Dec. 1, 1897.)
(No Model.)
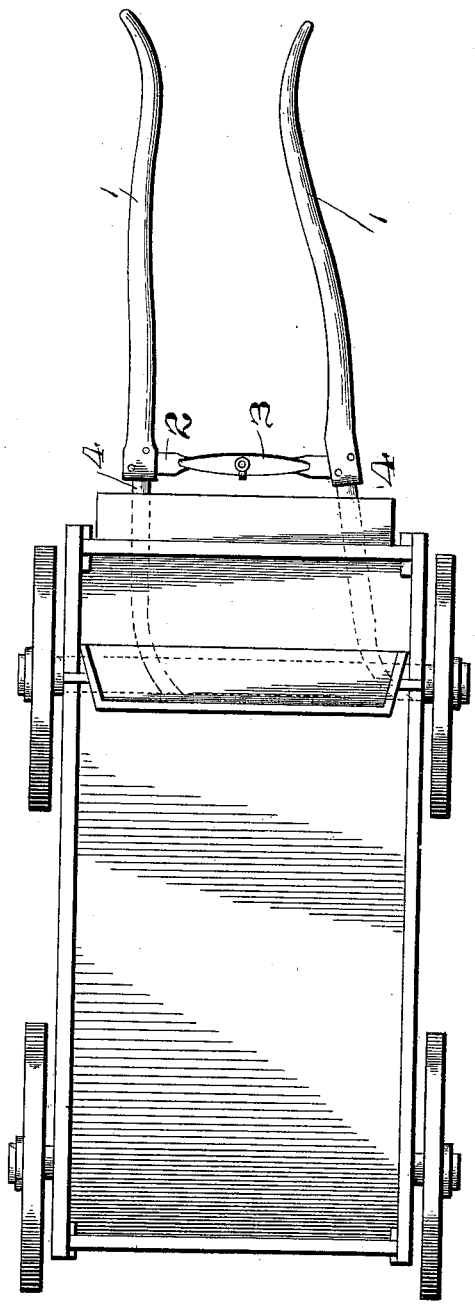
Witnesses
Inventor
Henry W. Oldaker.
his Attorney

UNITED STATES PATENT OFFICE.

HENRY W. OLDAKER, OF FOOTE, IOWA.

THILL FOR VEHICLES.

SPECIFICATION forming part of Letters Patent No. 614,495, dated November 22, 1898.

Application filed December 1, 1897. Serial No. 660,397. (No model.)

*To all whom it may concern:*

Be it known that I, HENRY W. OLDAKER, a citizen of the United States, residing at Foote, in the county of Iowa and State of Iowa, have invented certain new and useful Improvements in Thills; and I do hereby declare the following to be a full, clear, and exact description of the invention, such as will enable others skilled in the art to which it appertains to make and use the same.

This invention relates to improvements in thills for vehicles, the object of the same being to so construct and arrange the thills with respect to the vehicle as to permit the horse to travel in the road practically at one side of the vehicle.

To these ends and to such others as the invention may appertain the same consists in a pair of thills having thill-irons which are bent to one side, locating the thills practically at one side of the vehicle, one of the thills being parallel with the line of draft, while the other is at an angle, as will be hereinafter fully described, and specifically set forth in the claim.

In the accompanying drawing, which forms a part of this specification, the figure is a plan view of a vehicle provided with my improved thill.

Referring more particularly to the drawing, 1 1 designate the thills proper, which are connected to each other by a cross-bar 2, upon which is pivoted a singletree 3 of the ordinary construction. The cross-bar is connected to the thills in such manner as to have one of the thills practically straight, while the other is bent inward, as shown. To the rear ends of the thills are rigidly bolted or otherwise secured thill-irons 4 4, which are bent to one side, the ends being curved to bring the thill-eyes in position to properly connect with the vehicle. It will be noticed that the thill-iron which is connected to the curved thill is bent outward therefrom and the other thill-iron is bent in the same direction.

The thills constructed in accordance with my invention are coupled to the usual thill-couplings connected to the front axle of a vehicle, and by bending said thills in the peculiar manner herein shown and described the horse is permitted to travel practically at one side of the vehicle or out of the track made by said vehicle. This arrangement also admits of the horse being hitched closer to the vehicle.

By setting one of the thills oblique and the other straight the points of the thills are placed nearer one side of the vehicle than the other, thus producing the effect of setting the thills to one side without requiring them to be set over to the extent which their forward ends would appear to indicate and allowing both thills to remain within the lines of the wheels. By this arrangement the animal is also kept in close proximity to the load, just as much so as with the ordinary thills.

The thills are adapted to be applied to any and all kinds of vehicles, and where the ordinary thill-couplings are not provided may be connected to clips or other fastening devices.

It will of course be understood that thills may be either right or left hand and that they are applicable to road-carts as well as to buggies and sleighs.

Having thus described the invention, what I claim as new, and desire to secure by Letters Patent, is—

A pair of thills connected rigidly intermediate their ends by a cross-bar, one of the thills in advance of the cross-bar extending substantially at a right angle to the cross-bar and the other thill at an acute angle or obliquely, the portions of the thills in rear of the cross-bar being curved and deflected laterally toward the same side of the vehicle so as to adapt them to connect with the axle-clips under their usual arrangement, substantially as described.

In testimony whereof I affix my signature in presence of two witnesses.

HENRY W. OLDAKER.

Witnesses:
C. H. MCARTON,
JOSEPH MCARTON.